United States Patent [19]

Boehringer

[11] 4,172,469

[45] Oct. 30, 1979

[54] SOFT SEAT CHECK VALVE

[75] Inventor: Wilfred E. Boehringer, Fullerton, Calif.

[73] Assignee: McDonnell Douglas Corporation, Long Beach, Calif.

[21] Appl. No.: 875,405

[22] Filed: Feb. 6, 1978

[51] Int. Cl.² .............................................. F16K 15/06
[52] U.S. Cl. ................................................ 137/512.3
[58] Field of Search ............................. 137/512, 512.3

[56] References Cited

U.S. PATENT DOCUMENTS

| | | | |
|---|---|---|---|
| 1,960,963 | 5/1934 | Wheeler et al. | 137/512.3 X |
| 2,403,029 | 7/1946 | Smith. | |
| 2,481,482 | 9/1949 | Green. | |
| 2,500,156 | 3/1950 | Dechant | 137/512.3 |
| 2,595,012 | 4/1952 | Smith. | |
| 2,830,620 | 4/1958 | Shuptrine. | |
| 2,912,000 | 11/1959 | Green | 137/516.29 X |
| 2,912,001 | 10/1959 | Green. | |
| 3,029,835 | 4/1962 | Biello et al.. | |
| 3,171,440 | 3/1965 | Napolitano. | |
| 3,379,407 | 4/1968 | Napolitano. | |
| 3,542,063 | 11/1970 | Etter et al. | 137/512.3 |
| 3,642,029 | 2/1972 | Katchka. | |
| 3,749,123 | 7/1973 | Fletcher. | |

FOREIGN PATENT DOCUMENTS 1773073  7/1971  Fed. Rep. of Germany ........... 137/512

*Primary Examiner*—William R. Cline
*Attorney, Agent, or Firm*—Paul T. Loef; Walter J. Jason; Donald L. Royer

[57] ABSTRACT

A check valve having dual seats and dual poppets which act in a series arrangement as a double valve. One seat poppet combination employs an o-ring type seal and the second seat poppet arrangement employs a metal-to-metal sealing surface. Each seat poppet arrangement performs in typical check valve fashion. The mechanics of operation of the dual valve series arrangement is such that the soft seal valve always opens and closes under essentially zero flow conditions preventing extrusion or erosion of the soft seal and preserving the zero leakage sealing surface.

10 Claims, 2 Drawing Figures

SOFT SEAT CHECK VALVE

BACKGROUND OF THE INVENTION

This invention relates to check valves, and more particularly to check valves employing dual seats and dual poppets wherein one set relies on a metal-to-metal or hard seal and the other set relies on a resilient or soft seal.

Many prior attempts have been made to develop a zero leakage, soft seat check valve, all without success. In each of these known efforts, the seal was required to seat and unseat under high pressures and flows. In many cases the seal is washed out from its containment groove during opening of the valve and experiences substantial errosion of the resilient seal during the closing cycle. The most effective zero leakage check valve available to date has been one commercially available from Bertea Products, known as a Micro-Seal check valve. This valve utilized two flat-lapped elements, one of which is provided with a pair of closely spaced, concentric, circular, sharp edged raised seats. The engaging surfaces must be maintained very flat and, as a result, the valve is very expensive to manufacture. This valve works reasonably well under most conditions. However, the valve will leak when the conditions are such that the valve seat closes slowly.

BRIEF SUMMARY OF THE INVENTION

The present invention is a zero leak check valve employing a double seat and poppet arrangement operating in series. One seat poppet combination utilizes a resilient or soft sealing means and the other seat poppet combination employs a metal-to-metal seal. The operation of the valve is such that the soft seat always opens and closes at essentially zero fluid flow, which occurs because the hard seat poppet opens last in the normal flow direction and closes first in the reverse flow direction. This sequential operation protects the soft seal from damage or extrusion during opening and closing of the valve. The soft seal is further protected during flow conditions by enveloping the soft seat poppet with the hard seat poppet and removing the soft seal from the flow stream. The object of this invention is to protect the soft seal from wear or damage to ensure zero leakage sealing against the soft seal surface.

DETAILED DESCRIPTION

Figure 1:
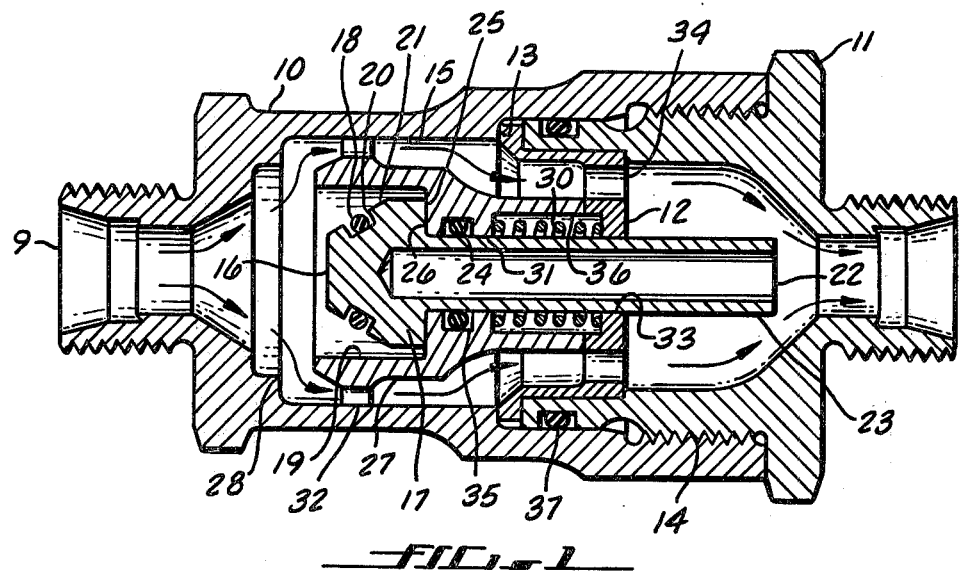
FIG. 1 is a sectional plan view of the soft seat check valve shown in the open position.
Figure 2:
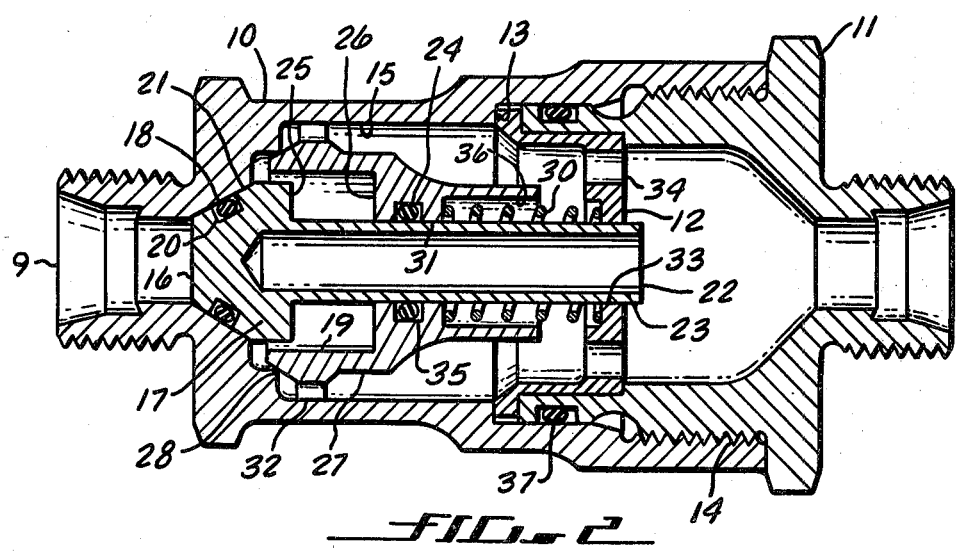
FIG. 2 is a sectional plan view of the soft seat check valve of the present invention shown in the closed position.

As shown in FIGS. 1 and 2, the female body portion 10 has an inlet port 9 which communicates with an enlarged bore 15. Fluid entering the valve port 9 impinges on the head 16 of the soft seat poppet 17 applying a pressure on the portion of the poppet head 16 as determined by the o-ring seal 18. The o-ring seal 18 is contained in a groove 20 provided in the conical surface 21 of the head 16 of the soft seal poppet 17. Of course, any downstream pressure will impinge upon the projected end portion 22 of the stem 23 of the poppet 17. This projected area is determined by the outside diameter of the stem 23. If the o-ring seal 18 located in the poppet head 16 is similar in diameter to the o-ring 24 circumscribing the stem 23, the upstream and downstream areas of the poppet 17 exposed to the fluid pressure will be similar. If the upstream and downstream projected areas of the poppet 17 exposed to the fluid pressure are the same, any increase in the upstream pressure over downstream pressure will create a force causing the poppet 17 to start to open allowing the upstream and downstream pressures to be working on exactly equal areas, the stem 23. The differential pressure then forces the poppet to travel axially until the movement is prevented by the stop 25, which engages the shoulder 26 of the hard seat poppet 27. At this point, the upstream fluid pressure impinges on the entire projected area of the hard seat poppet 27 as determined by the diameter of the hard seat 28 provided on the inside of the valve body portion 10.

While the two o-ring seals 18 and 24 need not be absolutely identical, any dissimilarity in their diameter effects (a) the area against which the upstream and downstream fluid impinges and (b) flow occuring across the seal 18 during the opening cycle. If the projected exposed area of the poppet head is sufficiently larger than that of the stem, the soft seat poppet 17 will open with negative or no differential pressure across the valve and with reverse flow across the seal 18. Conversely, if the area of the head is sufficiently smaller than the stem, it will take greater differential pressure to open the poppet and excessive forward flow will be experienced across the seal 18. Any flow, forward or reverse, across the seal 18 tends to wash the seal out of its groove 20. Of course, fluid must flow to displace the differential volume occupied by the poppet 17 forward of the seal 24 in the open and closed position. The object is to keep the flow velocity across the seal very close to zero at the time of valve opening to prevent damage to the soft o-ring seal 18. This velocity is minimized when the two seals 18 and 24 are of the same diameter.

Once the poppet stop 25 engages the shoulder 26, the soft seal 18 is protected from fluid flow damage by the enveloping surface 19 of the poppet 27. While this enveloping feature is not absolutely essential to the functioning of the valve, it permits the use of the softer material in the seal 18, which enhances its sealing ability.

With the soft seat poppet 17 in the open position, and the entire projected area of the hard seat poppet 27 exposed to the upstream pressure, a differential pressure across the valve which exceeds the biasing force of the spring 30 and any friction force will move the poppets 27 and 17 axially until arrested by the support 12. During axial movement, the poppet 27 is supported by the outer diameter of the stem 23 of the poppet 17. The outer diameter 32 of the hard seat poppet 27 is also guided and supported by the bore 15 of the female body portion 10. The outer perimeter 32 of the poppet 27 is intermittently void and solid with more void than solid. The voids, of course, provide the portals through which the fluid flows in the normal valve open operation and these voids must be sized for the design flow. The solid portions of this perimeter 32 bear against the bore 15 and provide support for the poppet 27.

While the two poppets 17 and 27 mutually support each other, the principle support for the poppet 17 is provided by the center bore 33 of the support 12. The support 12 is provided with a plurality of ports 34, which, again, must be sized according to the fluid flow required.

Support 12 is positioned by the inside diameter of the male body portion 11. A shoulder 13, provided in the enlarged bore 15 of the female body portion 10 retains the support 12 in conjunction with the male body portion 11. The two body portions 10 and 11 are connected via threads at 14 and sealed with an o-ring 37.

The o-ring seal 24, previously discussed, is contained in an annular groove 35 and provides a sliding seal between the two poppets 17 and 27. This resilient seal has the added function of providing some friction for the soft seat poppet 17 maintaining its last driven position. However, an alternative embodiment is to eliminate the o-ring seal 24 and provide a close fit between the stem 23 and the bore 31 provided in the 27 hard seat poppet.

Biasing spring 30 is contained in a cylindrical recess 36 in the poppet 27 and rides over the stem 23 of the poppet 17. Again, the differential pressure required across the valve to unseat the hard seat poppet is a function of the force applied by the spring 30 plus any friction force.

The hard seat poppet 27 is always forced to close ahead of the soft seat poppet 17 by the biasing spring 30. This action of the hard seat closing first stops all but a very small leakage flow during the seating of the soft seat seal 18. The soft seat seal 18 is then seated before any leakage pressurizes the seal. This sequence of seating, hard seat then soft seat, allows the soft seat o-ring to seat under very low flow and pressure conditions, protecting it from damage.

This invention is not limited to the embodiments disclosed above, but all changes and modifications thereof not constituting deviations from the spirit and scope of this invention are intended to be included.

I claim:

1. A zero leakage check valve comprising:
   valve body having an inlet port and an outlet port and a flow passage bore between said inlet and outlet ports;
   support means axially fixed in said bore and provided with a plurality of ports;
   first and second fixed, circular valve seats concentrically arranged and axially located in said bore with said second seat larger in diameter than said first seat;
   first poppet having a head containing a first resilient sealing means and a stem, said stem having a cross-sectional area essentially equal to the area sealed by said first resilient sealing means in said first poppet head when engaging said first valve seat, axially located in said bore with said head oriented against the direction of fluid flow and said stem slidably supported by said support means to allow engagement of said first poppet head with said first valve seat;
   second poppet having a head, oriented against the direction of fluid flow, and an aperture for slidably receiving said stem of said first poppet, so that said second poppet head may engage said second valve seat;
   second sealing means, between the engaging surfaces of said second poppet and the stem of said first poppet, and
   biasing means urging said second poppet head against the direction of fluid flow into engagement with said second valve seat whereby said first poppet seats and unseats at essentially zero flow as said second poppet unseats after and seats before said first poppet.

2. A zero leakage check valve as described in claim 1, wherein said first poppet head and said first fixed valve seat have conical surfaces.

3. A zero leakage check valve as described in claim 2, wherein the first resilient sealing means contained in said first poppet head is an o-ring.

4. A zero leakage check valve as described in claim 3 wherein said second sealing means between the engaging surfaces of said second poppet and the stem of said first poppet is an o-ring.

5. A zero leakage check valve as described in claim 3 wherein said longitudinal aperture in said second poppet is further provided with a counter bore at said head end, of diameter and depth to permit total envelopment of said first poppet head when said first poppet is in the open position so as to protect said o-ring from fluid flow.

6. A zero leakage check valve as described in claim 5 wherein said second sealing means is a lap fit between said first poppet stem and said aperature in said second poppet.

7. A zero leakage, high pressure, high flow check valve comprising;
   valve body having an inlet port and an outlet port and a flow passage bore between said inlet and outlet ports;
   support means axially fixed in said bore and provided with a plurality of ports;
   first and second fixed, circular valve seats concentrically arranged and axially located in said bore with said first seat having a conical surface and said second seat larger in diameter than said first seat;
   first poppet, generally cylindrically shaped, having a conical surface head containing a first resilient, circular shaped, sealing means and a cylindrical stem, said stem having a cross-sectional area essentially equal to the area sealed by said first resilient sealing means in said conical surface head of said first poppet when engaging said first valve seat, axially located in said bore with said head oriented against the direction of fluid flow and said stem slidably supported by said support means to allow engagement of said first poppet head with said first valve seat;
   second poppet, having a head oriented against the direction of fluid flow, and a longitudinal aperture provided with a counter bore at said head end, of diameter and depth to permit total envelopment of said first poppet head, with said aperture slidably receiving said stem of said first poppet so that said second poppet head may engage said second valve seat, whereby said first poppet head is protected from the flow stream by said second poppet when said valve is open;
   second sealing means, between the engaging surfaces of said second poppet and the stem of said first poppet, and
   biasing means urging said second poppet head against the direction of fluid flow into engagement with said second valve seat whereby said first poppet seats and unseats at essentially zero flow as said second poppet unseats after and seats before said first poppet.

8. A zero leakage check valve as described in claim 7 wherein both said first and second sealing means are o-rings.

9. A zero leakage check valve as described in claim 8 wherein said longitudinal aperture in said second poppet is further provided with a counter bore at said end opposite said head of diameter and depth to envelope said biasing means when said second poppet is in the full open position.

10. A zero leakage check valve as described in claim 7 wherein said first sealing means is an o-ring and said second sealing means is a lap fit between said first poppet stem and said aperture in said second poppet.

* * * * *